United States Patent
Murrells et al.

(10) Patent No.: US 10,044,733 B2
(45) Date of Patent: *Aug. 7, 2018

(54) SYSTEM AND METHOD FOR CONTROLLING A RENDERING DEVICE BASED UPON DETECTED USER PROXIMITY

(71) Applicant: D&M Holdings, Inc., Kanagawa (JP)

(72) Inventors: Nicholas Murrells, San Diego, CA (US); Peter Celinski, Los Gatos, CA (US); Martin Richard Wachter, Phoenix, MD (US); Anders Brogestam, Turramurra (AU)

(73) Assignee: D&M Holdings, Inc., Kanagawa (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/785,663

(22) Filed: Oct. 17, 2017

(65) Prior Publication Data
US 2018/0041519 A1    Feb. 8, 2018

Related U.S. Application Data

(63) Continuation of application No. 14/853,025, filed on Sep. 14, 2015, now Pat. No. 9,825,969.

(51) Int. Cl.
*H04L 29/06* (2006.01)
*G06F 3/14* (2006.01)
*G06F 3/16* (2006.01)

(52) U.S. Cl.
CPC .............. *H04L 63/107* (2013.01); *G06F 3/14* (2013.01); *G06F 3/165* (2013.01); *H04L 63/08* (2013.01); *H04L 63/101* (2013.01)

(58) Field of Classification Search
CPC ... H04L 63/107; H04L 63/08; H04L 63/0869; H04L 63/0876; H04L 63/101; G06F 3/14; G06F 21/44; G06F 21/445
(Continued)

(56) References Cited

U.S. PATENT DOCUMENTS 6,212,282 B1    4/2001    Mershon
6,650,963 B2    11/2003   DiLorenzo
(Continued)

FOREIGN PATENT DOCUMENTS

WO    2014118793 A1    8/2014
WO    2014174523 A1    10/2014

OTHER PUBLICATIONS

International Search Report and Written Opinion for PCT/US16/48108, dated Oct. 31, 2016.

*Primary Examiner* — Hosuk Song
(74) *Attorney, Agent, or Firm* — Peter A. Nieves; Sheehan Phinney Bass & Green PA

(57) ABSTRACT

A method is disclosed for generating a media playlist by a media rendering device having a proximity detector. The proximity detector detects a first identification device, receives a first identification associated with the first identification device, and selects a first preference list associated with the first identification. The proximity detector detects a second identification device, receives a second identification associated with the second identification device, and selects a second preference list associated with the second identification. The media player generates a combined preference list based upon the first preference list and the second preference list and generates a playlist of songs based on the combined preference list.

20 Claims, 11 Drawing Sheets

(58) Field of Classification Search
USPC .................................. 726/2–7; 713/168–170
See application file for complete search history.

(56) References Cited

U.S. PATENT DOCUMENTS

| | | | |
|---|---|---|---|
| 7,373,414 B2 | 5/2008 | Evron et al. | |
| 7,689,510 B2 | 3/2010 | Lamkin | |
| 7,783,767 B2 | 8/2010 | Collazo | |
| 7,805,210 B2 | 9/2010 | Cucos et al. | |
| 8,014,761 B2 | 9/2011 | Kelly | |
| 8,135,624 B1* | 3/2012 | Ramalingam | G06Q 20/10 705/26.1 |
| 8,281,027 B2* | 10/2012 | Martinez | H04L 67/18 709/203 |
| 8,307,092 B2 | 11/2012 | Svendsen | |
| 8,602,885 B2 | 12/2013 | Arezina | |
| 8,627,075 B2* | 1/2014 | Ikeda | H04B 5/02 455/41.1 |
| 8,666,306 B2 | 3/2014 | Malik | |
| 8,711,737 B2* | 4/2014 | Kandekar | G06Q 30/0251 370/265 |
| 8,725,113 B2 | 5/2014 | Gargi et al. | |
| 8,856,375 B2 | 10/2014 | Martinez | |
| 8,881,204 B2 | 11/2014 | Ojala et al. | |
| 8,973,066 B2 | 3/2015 | Hilson | |
| 9,119,067 B2* | 8/2015 | Santamaria | H04L 51/04 |
| 9,825,969 B2* | 11/2017 | Murrells | H04L 63/107 |
| 2005/0094610 A1 | 5/2005 | deClerq et al. | |
| 2007/0297459 A1 | 12/2007 | Cucos et al. | |
| 2008/0222546 A1 | 9/2008 | Mudd et al. | |
| 2009/0216855 A1 | 8/2009 | Lang et al. | |
| 2013/0159350 A1 | 6/2013 | Sankar et al. | |
| 2013/0231044 A1 | 9/2013 | Wang | |
| 2013/0304789 A1 | 11/2013 | Herlein et al. | |
| 2014/0006152 A1 | 1/2014 | Wissner-Gross et al. | |
| 2014/0274185 A1 | 9/2014 | Luna et al. | |

\* cited by examiner

FIG. 4A

User 1 Preferences — 411

| Genre | Artist | Rating |
|---|---|---|
| Rock | - | **** |
| Rock | Rolling Stones | ** |
| Country | - | * |
| Rock | The Eagles | **** |
| Rock | The Beatles | **** |

User 2 Preferences — 412

| Genre | Artist | Rating |
|---|---|---|
| Rock | - | **** |
| Rock | Elton John | **** |
| Country | Shania Twain | **** |
| Rock | The Eagles | ** |
| Rock | The Beatles | **** |

FIG. 4B

Combined Preferences — 420

| Genre | Artist |
|---|---|
| Rock | - |
| Rock | The Beatles |
| Rock | The Eagles |
| Rock | Elton John |
| ~~Rock~~ | ~~Rolling Stones~~ |
| ~~Country~~ | ~~Shania Twain~~ |
| ~~Country~~ | |

FIG. 4C

| Artist | Song |
|---|---|
| Beatles | Help! |
| Elton John | Candle in the Wind |
| Eagles | Hotel California |
| The Who | My Generation |
| Beatles | Come Together |
| Eagles | Already Gone |
| Elton John | Honky Cat |
| .. | .. |

Resulting Playlist — 450

SYSTEM AND METHOD FOR CONTROLLING A RENDERING DEVICE BASED UPON DETECTED USER PROXIMITY

CROSS-REFERENCE TO RELATED APPLICATIONS

This application is a continuation of and claims the benefit of U.S. patent application Ser. No. 14/853,025, filed Sep. 14, 2015, entitled "System and Method for Controlling a Rendering Device Based Upon Detected User Proximity," which is incorporated by reference herein in its entirety.

FIELD OF THE INVENTION

The present invention relates to media rendering, and more particularly, is related to controlling media rendering devices.

BACKGROUND OF THE INVENTION

It has become commonplace for an individual to have access to multiple devices that render media, such as an mp3 player, a car stereo, a home entertainment system, a portable computer or tablet, a gaming console, and a smart phone, among others. Two or more of these rendering devices may have access to a communications network and/or the internet, and be configured to render digital media provided over the communications network and/or the internet, for example, a digital media streaming service.

Unfortunately, continuity of rendering of digital media may be interrupted as a user transitions between devices, for example, by moving from a first region with a first rendering device to a second region with a second rendering device. Another example includes transitioning from a personal media rendering device, such as a smart phone, to a transportation based rendering device, such as an automobile sound system. Therefore, there is a need in the industry to address one or more of the abovementioned shortcomings.

SUMMARY OF THE INVENTION

Embodiments of the present invention provide a system and method for controlling a rendering device based upon a detected proximity of a user. Briefly described, a first aspect of the present invention is directed to a method for generating a media playlist by a media rendering device having a proximity detector. The proximity detector detects a first identification device, receives a first identification associated with the first identification device, and selects a first preference list associated with the first identification. The proximity detector detects a second identification device, receives a second identification associated with the second identification device, and selects a second preference list associated with the second identification. The media player generates a combined preference list based upon the first preference list and the second preference list and generates a playlist of songs based on the combined preference list.

A second aspect of the present invention is directed a media rendering system including a first user identification device configured to provide a first user identity identifying the first user identification device and a second user identification device configured to provide a second user identity identifying the second user identification device. A proximity detecting device is configured to detect and receive the first and second user identities from the first and second user identification device when they are located within a proximity detecting region of the proximity detecting device. A media rendering device is configured to receive the first user identity and the second user identity from the proximity detecting device and access user preferences associated with the first and second user identities. The media rendering device is configured to operate according to a first operating manner derived from the first user preference, the media rendering device is configured to operate according to a second operating manner derived from the second user preference, and the media rendering device is configured to operate according to a third operating manner derived from the first user preference and the second user preference.

Other systems, methods and features of the present invention will be or become apparent to one having ordinary skill in the art upon examining the following drawings and detailed description. It is intended that all such additional systems, methods, and features be included in this description, be within the scope of the present invention and protected by the accompanying claims.

BRIEF DESCRIPTION OF THE DRAWINGS

The accompanying drawings are included to provide a further understanding of the invention, and are incorporated in and constitute a part of this specification. The components in the drawings are not necessarily to scale, emphasis instead being placed upon clearly illustrating the principles of the present invention. The drawings illustrate embodiments of the invention and, together with the description, serve to explain the principles of the invention.

FIG. 4A is two charts showing a simplified list of preferences for a first user and a second user.

FIG. 4B is a chart showing a combined list of preferences for the first user and the second user.

FIG. 4C is a chart showing a playlist generated using the combined list of preferences for the first user and the second user.

DETAILED DESCRIPTION

Figure 1A:
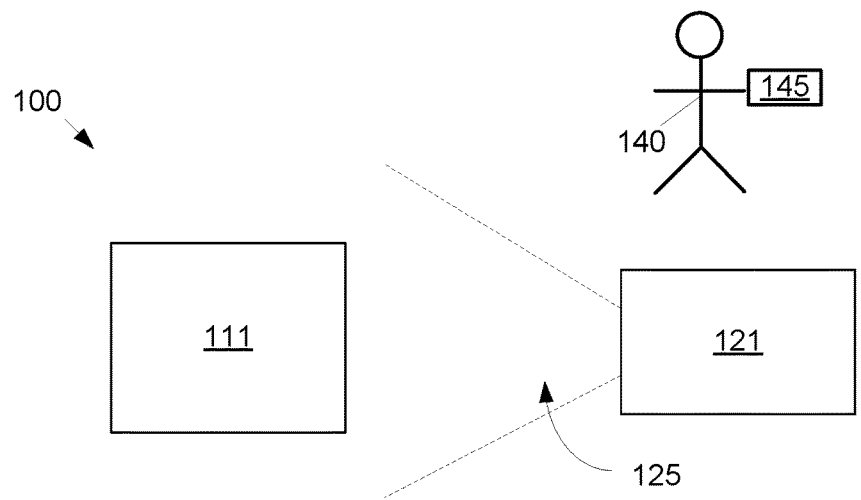
FIG. 1A is a schematic diagram depicting a first embodiment of a proximity detecting rendering system.

The following definitions are useful for interpreting terms applied to features of the embodiments disclosed herein, and are meant only to define elements within the disclosure.

As used within this disclosure, "media" refers to audio and/or video content either stored on a storage medium, such as a disk drive or digital disk, or streamed from a media server. Media may refer to analog and/or digitally formatted data.

As used within this disclosure, an originating provider of media, either streamed or locally stored, is referred to as a "media source." Examples of a media source include a music and/or video server, an internet radio, a streaming service, or a cache of media files.

As used within this disclosure, "rendering" refers to playback of media by a media player, also referred to herein as a "rendering device." Examples of rendering devices include, but are not limited to, an mp3 player, a tablet computer, a portable stereo, a home entertainment system, a portable video player, a smart phone, a laptop or desktop computer, and a mobile entertainment system.

As used within this disclosure, a "user" refers to a person consuming media from a rendering device.

As used within this disclosure, a "cue point" refers a playback time location in a rendered media.

As used within this disclosure, a "local device," such as a server, refers to a network element directly connected to a local area network (LAN), while a remote device refers to an item that may be in communication with local network elements, for example, via the internet, but is not directly connected to the LAN.

As used within this disclosure, a "playlist" is a modifiable data structure containing an ordered list of media, or an ordered list of references to media. A playlist may be stored, for example, on a rendering device or a server. A playlist may be modified to add, remove, and/or re-order media or media references. Since playlists containing media references do not contain audio or video content, they are generally small in size and therefore readily transportable. A display playlist is a text listing of media in a playlist, and may include a subset of identifying parameters of a media, such as title, artist, duration, and date, among others.

As used within this disclosure, "streaming" refers to a process of real-time transmitting media of a recording by a source to a rendering device. The rendering device may begin rendering the media before the entire recording has been transmitted. Streaming is generally transitory, such that the streamed data is not retained after it has been rendered. Portions of a received stream may be buffered for rendering, for example, to ensure rendering is uninterrupted during short interruptions of the streamed transmission. In contrast, a downloaded digital multimedia file is generally received in its entirety before it may be rendered. A downloaded digital multimedia file is generally retained in a memory for subsequent rendering, while a streamed file is generally re-streamed for subsequent renderings. "Streaming a song" is shorthand for streaming media of an audio recording identified by a song.

As used within this reference, "preferences of a user" refers to a set of preferences associated with a user identification device. While it is presumed herein that the user identification is associated with a specific user, the system described herein will associate the set of preferences associated with a user identification device regardless of whether the user or another individual is detected, for example, while carrying the identification device. It should be noted that a single identification device may be used to identify more than one user, for example, when a user switches an account on the identification device.

As used within this reference, "operating manner" refers to the operation of a device according to a specified configuration of one or more operating parameters and/or rendering of specified media. Such parameters may include, an audio volume level, an audio equalization curve, a video brightness setting, a video color ratio, a number of audio channels, an audio speaker configuration, a video resolution, a video aspect ratio, a delay setting, a channel down mix, a channel expansion, a dynamic range ratio, and two or three dimensional video presentation, among others.

As used within this reference, "proximity" refers to a distance, or a distance range between a detected object and a proximity detecting device. The distance range may be a function of orientation with respect to the proximity detecting device.

As used within this reference, "proximity detecting device" refers to a device configured to detect an object within a specified detection region, possibly bounded by direction and distance with respect to the proximity detecting device. The proximity detecting device may only detect objects within a maximum distance at any particular direction. The maximum distance may vary based upon a directional orientation with respect to the proximity detecting device, and may be limited based on physical obstacles within the detection region. For example, a particular proximity detecting device may be limited by line of sight.

Reference will now be made in detail to embodiments of the present invention, examples of which are illustrated in the accompanying drawings. Wherever possible, the same reference numbers are used in the drawings and the description to refer to the same or like parts.

Generally, embodiments of the present invention include one or more rendering devices in communication with one another, and in communication with one or more proximity detector(s). Each rendering device renders media provided by a media source, for example, stored within the rendering device or via a communication network. Each rendering device plays media in a play queue, or from a media stream. One or more rendering device may be located within a premises such as a dwelling or business, for example, in separate rooms. Each rendering device is in communication with one or more proximity detectors. The proximity detector(s) may be co-located with the rendering device, or may be separately located from the rendering device. The proximity detector is configured to detect a user identification device, for example, on the person of a user who is able to experience the rendering of media by the rendering device. Control of the one or more rendering devices and/or the selection of media rendered by the one or more media devices may be determined based on a proximity of the user identification device to the one or more media devices as detected by the one or more proximity detectors.

FIG. 1A shows a first embodiment of a rendering system 100. The system 100 includes a first rendering device 111 and a first proximity detector 121 for example located within a room. The first rendering device 111 and a first proximity detector 121 may be in communication, for example, via a direct hard wired communication channel, or via a wireless communication channel, such as a Bluetooth, WiFi, or other radio frequency (RF) channel, or audio, such as ultrasonic. The first proximity detector 121 detects the presence of a first identification device 145 within a detection region 125, and informs the first rendering device 111 of the presence of the first identification device 145. The first proximity detector 121 may also use other detected information to determine the presence of the first identification device 145, for example whether the identification device 145 is quickly passing through the detection region 125, or the first identification device 145 is dwelling in the detection region 125.

The first user 140 has the first identification device 145 on his person. For example, the first user 140 may carry the first identification device 145, such as an RFID tag, a Bluetooth Low Energy (BLE) tag, or a smart phone configured to communicate with the first proximity detector 121, for example using BLE. The first user 140 may be holding the first identification device 145 in his hand, carrying the first identification device 145 in his pocket, or may be wearing the first identification device 145 on his clothing, for example, on his belt. An identification device 145 may be implanted in the person of a user. The first proximity detector 121 may detect the identification device using a variety of techniques, including, but not limited to photo feature recognition, facial recognition such as Xbox Kinect, among others, wireless communication, such as Bluetooth/ BLE or ZigBee, to voice-print analysis. The first identification device 145 is configured to provide an identification 146 (FIG. 1B), for example, a data field or tag, to the first proximity detector 121 that may specifically identify the first user 140 when the first identification device 145 is within the detection region 125 of the first proximity detector 121. Alternatively, or in addition, the first identification device 145 may be configured to receive the identification 146 (FIG. 1B), from the first rendering device 111, for example via BLE. While FIG. 1A depicts the detection region 125 as being directional with respect to the first proximity detector 121, the detection region 125 may not be directional, for example omnidirectional, and a function only of distance of the first identification device 145 from the first proximity detector 121, or a combination of distance and direction of the first identification device 145 with respect to the first proximity detector 121.

FIG. 1A depicts the first rendering device 111 and the first proximity detector 121 as boxes drawn with solid lines, indicating that neither the first rendering device 111 nor the first proximity detector 121 is aware of the presence of the first user 140 or the first identification device 145.

Figure 1B:
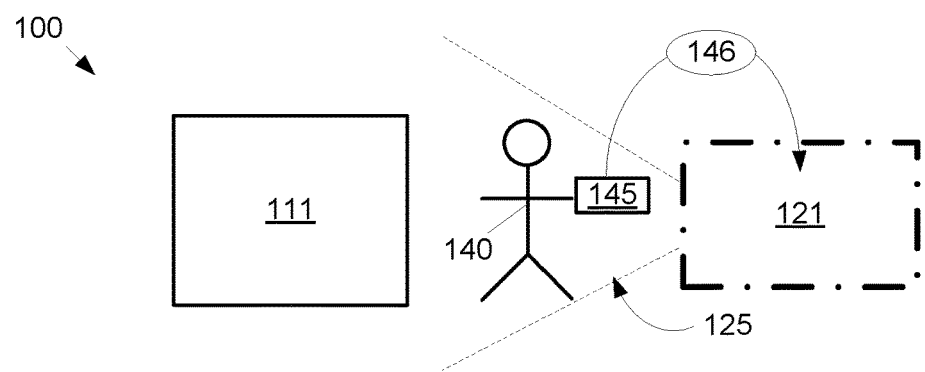
FIG. 1B is a schematic diagram depicting the first embodiment of the proximity detecting rendering system detecting a user.

In FIG. 1B, the first user 140 has entered the detection region 125 of the first proximity detector 121. The first proximity detector 121 detects the identification device 145. FIG. 1B depicts the first rendering device 111 with a dash-dot line, indicating the first identification device 145 of the first user 140 has been detected by the first proximity detector 121.

Figure 1C:
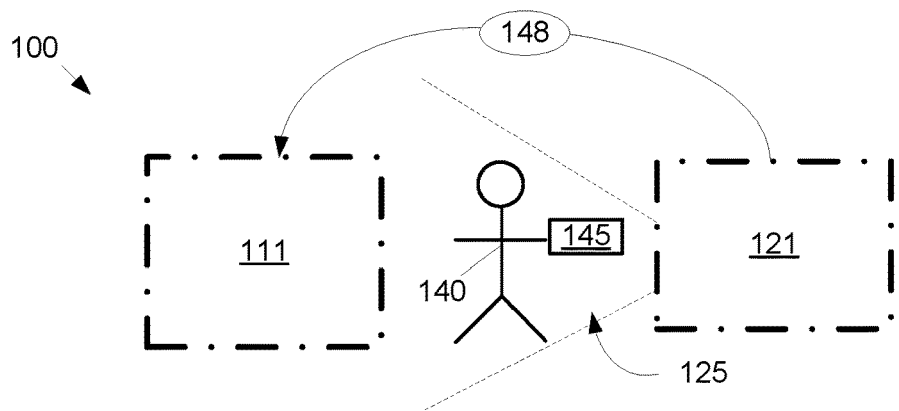
FIG. 1C is a schematic diagram depicting the first embodiment of the proximity detecting rendering system providing user identification to a media rendering device.

The first proximity detector 121 may determine or access an identification 148 (FIG. 1C) for the first identification device 145. For example, the identification 148 (FIG. 1C) may include an identification code or tag, and/or a data file containing identification fields. For example, the identification 148 (FIG. 1C) may be associated with a user account for an entertainment system. The user account identifier may be passed as the identification 148 (FIG. 1C). Such parameters for that user such as service log-in credentials and history and preferences may be stored in the cloud. Alternatively, the identification 148 (FIG. 1C) may be nothing more than the unique identification 146 provided directly to the first proximity detector 121 during detection of the identification device 145.

The first proximity detector 121 provides the identification 148 (FIG. 1C) to the first rendering device 111. FIG. 1C depicts the first rendering device 111 with a dash-dot line, indicating the first rendering device 111 is aware the first identification device 145 has been detected by the first proximity detector 121. The first rendering device 111 may be configured to render media, for example, a stored playlist, or a stream from a media source.

Figure 1D:
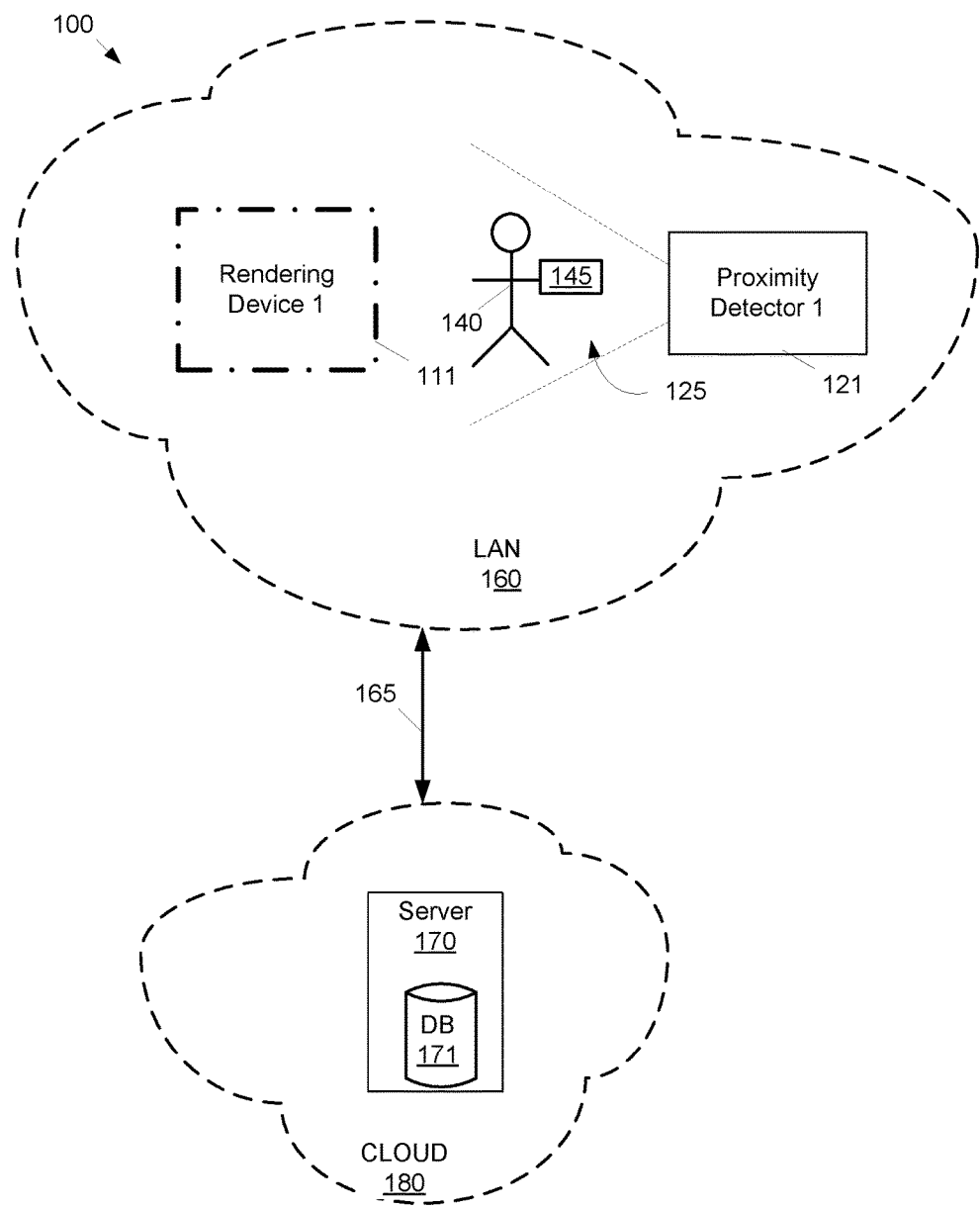
FIG. 1D is a schematic diagram depicting the first embodiment of the proximity detecting rendering system in the context of a network.

The first proximity detector 121 may be incorporated within the first rendering device 111, or the first proximity detector 121 may be independent from the first rendering device 1, and in communication with the first rendering device via a network, for example, a wireless local area network (LAN) 160 (FIG. 1D). The first rendering device 111 may be configured to respond to awareness of the proximity of the first identification device 145 in one or more ways, as described further below. Alternatively, the first rendering device 111, first identification device 145, and/or the first proximity detector 121 may be in communication via a subnetwork within the LAN or via a proprietary communication scheme independent of the LAN.

In FIG. 1C, the first rendering device 111 has determined the identity of the first user 140 via the detected identification device 145, such that the first rendering device 111 may respond to the first user 140 in a manner specific to the first user 140. For example, a set of user preferences associated with the first identification device 145 may be pre-configured into (i.e., stored within) the first rendering device 111, or the first proximity detector 121 may communicate a set of user preferences associated with the first identification device 145 to the first rendering device 111 as part of the identification 148, or along with the identification 146, 148. Alternatively, the first proximity detector 121 and/or the first rendering device 111 may retrieve preference data associated with the identification 146, 148 via the LAN 160 (FIG. 1D), for example, from a local or remote server 170 (FIG. 1D) storing the preference data associated with the particular first identification device 145, for example, within a database 171 (FIG. 1D).

In alternative embodiments the first identification device 145 may be in communication with the LAN 160 (FIG. 1D), and the first identification device 145 may store a user profile containing preferences regarding configuration parameters for rendering devices and/or media preferences. The user profile may contain user identification information and include information regarding media preferences, a list of devices used by the user, and/or a list of media streaming services subscribed to by the user. The user profile may be stored on one or more devices 145, 121, 111, and be communicated between the devices 145, 121, 111. For example, an application (or "app") on a smartphone may be configured to collect and store user preferences as a user profile, where the smartphone serves as the identification device 145. The first identification device 145 may communicate the user profile to the first rendering device 111 and/or the first proximity detector 121.

As noted previously, FIG. 1C depicts the first rendering device 111 with a dash-dot line, indicating the first rendering device 111 is aware the first identification device 145 has been detected by the first proximity detector. The dash-dot line may also signify that the first rendering device 111 has received an identity profile associated with the first identification device 145. As a result, the first rendering device 111 may re-configure itself according to the user profile of the first user 140 identified by the identification device 145, such that the first rendering device 111 may accept commands from the first user 140, and/or the first rendering device 111 may select media to render based at least in part upon the user profile of the first user 140.

The first rendering device 111 renders media and/or responds to commands of the first user 140 when the presence of the first identification device 145 is detected by the first proximity detector 121, and may stop rendering media when the first identification device 145 is not detected by the first proximity detector 121. The playback may reflect an audio rendering preference of the first user 140, for example, but not limited to, choice of media, volume level, balance, and/or an equalization (tone) curve, a number of audio channels (e.g., one channel for mono or two channels for stereo), and an audio speaker configuration (e.g., surround sound speaker configurations with or without a subwoofer, center channel, side and/or rear speakers). Rendering preferences may also or instead reflect a video rendering preference of the first user 140, for example, but not limited to, a video brightness setting, a video color ratio/pallet, a video resolution (e.g., standard definition v. high definition), a video aspect ratio, three dimensional (3D) video, among others. In general, a preference may only be implemented by the first rendering device 111 if the first rendering device 111 is capable of executing the preference. For example, a first rendering device 111 with a single audio speaker may be incapable of rendering audio in stereo.

In particular, user preferences are tailored to the specifically identified user 140, as associated with the user identification device 145. Alternatively, the first rendering device 111 may configure itself to operate based upon a default profile if the first proximity detector 121 detects the presence of a person, but is not able to identify the person as a user.

FIG. 1D is a schematic diagram depicting the first embodiment of the proximity detecting rendering system 100 in the context of a network. The proximity detecting rendering system 100 may operate within a communications network, for example the LAN 160. The LAN may have an internet connection 165 to access cloud based services, for example, a server 170 accessing a database 171 in the cloud 180. The server 170 may access preference information associated with the first identification device 145, and convey the preference information to one or more of the first rendering device 111, the first proximity detector 121, or the identification device 145. In alternative embodiments, the server 170 and/or the database 171 may be situated locally to the LAN 160.

Figure 2A:
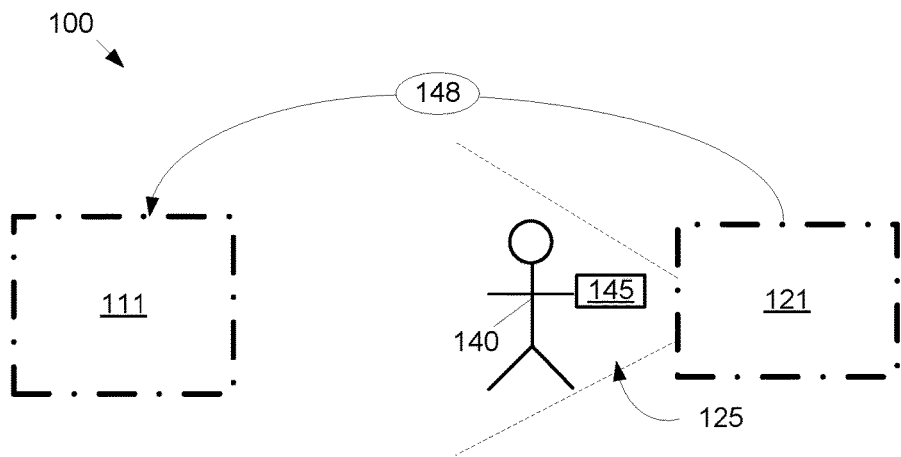
FIG. 2A is a schematic diagram depicting the first embodiment of the proximity detecting rendering system providing user identification for a first user to the media rendering device.

The system 100 under the first embodiment may be responsive to detecting more than one user 140. For example, FIG. 2A shows the system 100 where a first identification device 145 has been detected by the first proximity detector 121, and the first rendering device 111 has received the identification 148 from the first proximity detector 121, and has configured itself according to the preferences of the first user 140. For example, the first rendering device 111 may be rendering a playlist including media identified by the first user 140 in the preferences obtained according to the identity information provided by the first identification device 145.

Figure 2B:
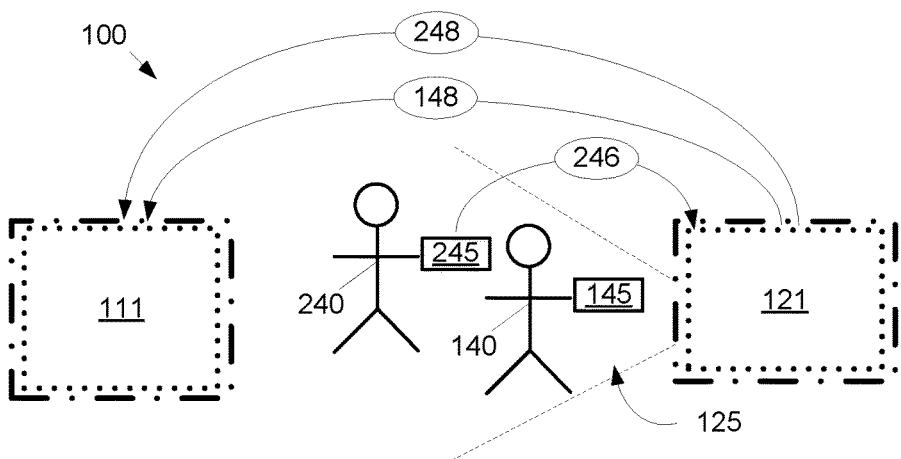
FIG. 2B is a schematic diagram depicting the first embodiment of the proximity detecting rendering system providing user identification for a second user to the media rendering device.

FIG. 2B shows the system 100 after a second user 240 has been detected by the first proximity detector 121. For example, the first proximity detector detects the second identification device 245 on the person of the second user 240, and passes the identification 248 of the second user 240 to the first rendering device 111. FIG. 2B shows both the first proximity detector 121 and the first rendering device 111 as recognizing the second user 240 with a dotted line. The first rendering device 111 may then configure itself to be responsive to the preferences of both the first user 140 and the second user 240. For example, the first rendering device may be rendering a playlist including media identified by the first user 140 in the preferences of the first user 140 and media identified by the second user 240 in the preferences of the second user 240. For example, the first rendering device 111 may render a playlist that only contains media preferred by both the first user 140 and the second user 240. Alternatively, the first rendering device 111 may render a playlist that is a combination of media preferred by the first user 140 and media preferred by the second user 240. The detection of multiple users 140, 240 may also change the media content in other ways. For example, a mixture of the preferences of the multiple may be combined using rules to construct a playlist, such as blocking (omitting) or prioritizing content based on the media preferences, for example, media ratings, of individual users. While FIG. 2B shows the detection of two users 140, 240 by the system 100, by extension, the system 100 may detect three or more users, and configure itself to operate according to the preferences of one, two, three, or more of the detected users. The system 100 may be configured to prioritize the preferences of one user over another. For example, the system may be configured according to rules such as having the system owner influence 50% of song selections, or to play a song for the most recently detected user to welcome her.

Figure 3A:
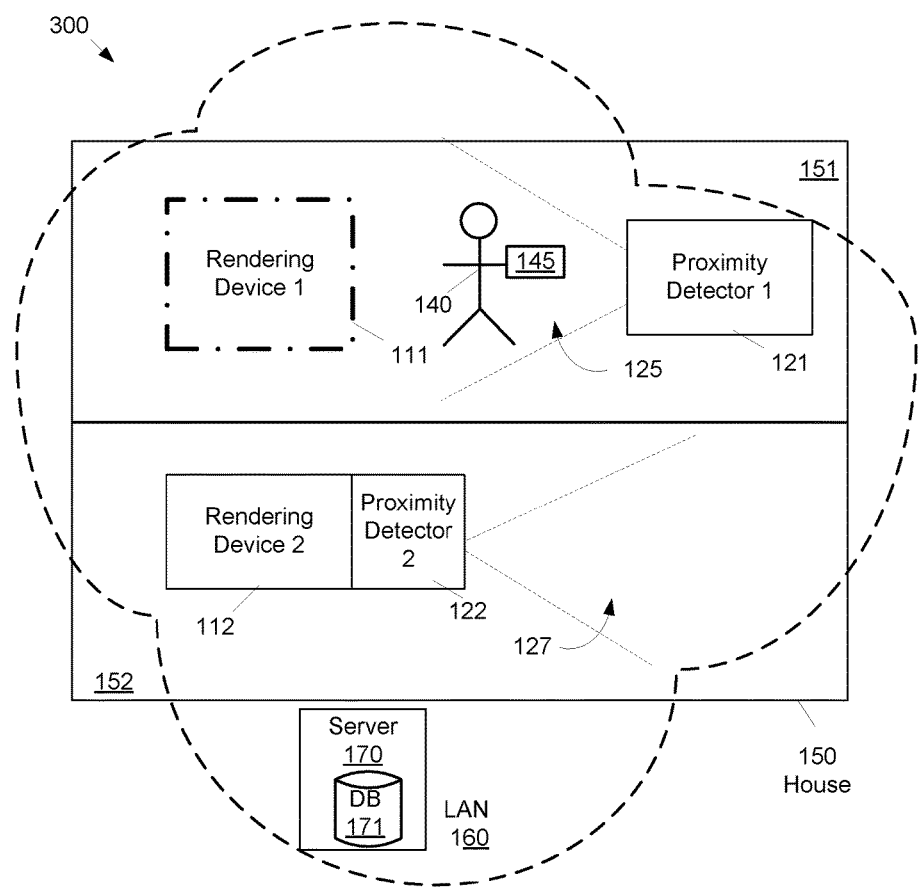
FIG. 3A is a schematic diagram depicting a second embodiment of a proximity detecting rendering system deployed within a premises.

FIG. 3A shows a second embodiment of a rendering system 300 within a premises 150, for example, an apartment, with a first region 151, for example, a living room, and a second region 152, for example, a kitchen. A first rendering device 111 and a first proximity detector 121 are located within the first region 151. The first proximity detector 121 detects the presence of a first identification device 145 within the first region 151, and informs the first rendering device 111 of the presence of the first identification device 145. FIG. 3A depicts the first rendering device 111 with a dash-dot line, indicating the first rendering device 111 is aware the first identification device 145 has been detected by the first proximity detector 121.

While FIG. 3A shows two regions 151, 152 as rooms of a single premises 150 for explanatory purposes, the second embodiment is not limited to a single premises. For example, the first region 151 may be an indoor location, and the second region 152 may be an outdoor location. As another example, the first region 151 may be in a building, and the second region 152 may be in a vehicle.

The first proximity detector 121 may be incorporated within the first rendering device 111, or the first proximity detector 121 may be independent from the first rendering device 111, and in communication with the first rendering device via a network, for example, a wireless LAN 160. The first rendering device 111 may be configured to respond to awareness of the proximity of the first identification device 145 in one or more ways, as described further below.

Figure 3B:
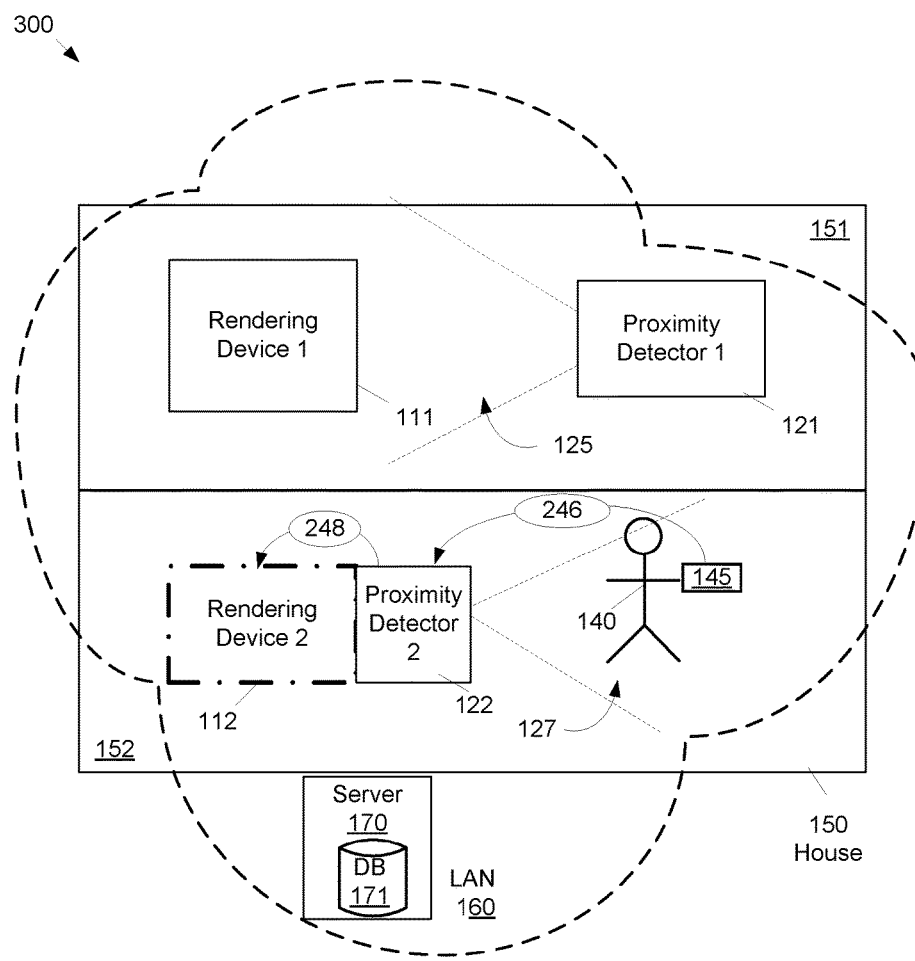
FIG. 3B is a schematic diagram depicting the second embodiment of the proximity detecting rendering system of FIG. 1A showing the user in a different region.

For example, the user 140 may be consuming media from the first rendering device 111 in the first region 151. The first rendering device 111 may be playing media from a playlist, or from a streaming media source, among other possible media sources. The user 140 moves from the first region 151 to the second region 152 where a second rendering device 112 is located, as shown by FIG. 3B. The second proximity detector 122 detects the first identification device 145 within a second proximity region 127, and alerts the second rendering device 112 that the user 140 is nearby. The second rendering device 112 may communicate with the first rendering device 111 to determine the media being rendered by the first rendering device 111. The second rendering device 112 buffers the media being rendered from the first rendering device 111 to facilitate a smooth handoff from the first rendering device 111 to the second rendering device. The second rendering device 112 starts to render media being rendered by the first rendering device 111 at the same playback (cue) point as the first rendering device 111. The first rendering device 111 may optionally stop rendering media user is detected in the proximity of the first rendering device 111 by the first proximity detector 121.

The first rendering device 111 and second rendering device 112 may render the media simultaneously (i.e., from the same cue point) for some period of time while the user 140 is transitioning from the first region 151 to the second region 152. Thereafter, the first rendering device 111 may cease rendering the media when no first identification device 145 is detected by the first proximity detector 121. The user 140 experiences continuity of listening to the media as he moves between proximity detection regions 125, 127 of different proximity detectors 121, 122 associated with different rendering devices 111, 112. Other actions may be triggered based on the sensed proximity or absence of proximity of a user 140, such as pausing rendering and/or muting the rendering devices 111, 112.

The rendering devices 111, 112 may be configured to behave differently when there is a "party" going on (more than one or two users 140 detected) under the first and/or second embodiment. For example, the detection of two or more users 140, 240 may initiate a party mode. Alternatively, the party mode may be manually configured, or scheduled for specific times. In the party mode the first rendering device 111 may continue rendering when no users are detected by the first proximity detector 121. For example, in party mode it may be assumed that not all persons in range of the first rendering device 111 are also carrying an identification device 145, 245 detectable by the first proximity detector 121, so it may be desirable the first rendering device 111 may continue rendering when no users are detected by the first proximity detector 121. In contrast, when not in party mode, it may be desirable for the first rendering device 111 to cease rendering when no users are detected by the first proximity detector 121.

In party mode, a combined playlist may be generated and/or shared/distributed among two or more rendering devices 111, 112, based upon the preferences of two or more users, as described further below. The combined playlist may be generated by, for example, one of the rendering devices 111, 112, and may automatically be saved to each of the user preferences of any users 140, 240 detected by one or more proximity detectors 121, 122 for later use without specifically saving the playlist. For example, the combined playlist may be stored in a cloud based preference file associated with each identification device 145, 245 detected by one or more proximity detectors 121, 122.

FIG. 4A shows two charts depicting a simplified set of media preferences for a first user and a second user. A first list 411 shows a list of media preferences for the first user. A second list 412 shows a list of media preferences for the first user. The first list 411 and the second list 412 indicate an artist and/or a media genre, and an associated user assigned rating (preference). For example, in the first list 411 the first user indicates a strong preference for rock music by rating the rock genre with four stars, while indicating an aversion to country music by rating the country genre with one star. Likewise, the first user list indicates a strong preference for rock artists The Eagles and The Beatles by a four star rating, but indicates a moderately weak reference for rock artist The Rolling Stones by a two star rating.

For example, in the second list 412 the second user also indicates a strong preference for rock music by rating the rock genre with four stars, along with a strong preference for rock artists The Beatles and Elton John, and country artist Shania Twain by a four star rating, but indicates a moderately weak reference for rock artist The Eagles with a two star rating.

FIG. 4B is a chart showing a combined set of preferences for the first user and the second user. The first rendering device 111 (FIG. 2B) may combines the first list 411 and the second list 412 in a combined list 420. The preferences of the first list 411 and second list 412 may be combined in a number of manners. For example, any artists and/or genres indicated by a two star rating or less in either the first list 411 or the second list 412 may be omitted from the combined list 420. Accordingly, the combined list 420 includes the rock genre, and rock artists the Beatles, the Eagles, and Elton John. However, the combined list 420 omits the rock artist The Rolling Stones because the second list 412 gives The Rolling Stones a two star rating, and omits the country genre because the first list 411 gives a one star rating to the country genre. Similarly, the artist Shania Twain is omitted from the combined list 320 since Shania Twain is an artist of the country genre. In this example, the threshold for inclusion in the combined list 320 was a rating above two stars. Other thresholds and inclusion/omission methods may be used in alternative embodiments.

FIG. 4C shows a playlist 450 generated using the combined set of preferences 420 for the first user and the second user. The playlist 450 includes media files (for this example, songs) selected according to the combined preference list 420. For example, the playlist 450 may include (and even favor) songs by artists specifically included in the combined preference list 420. The playlist 450 may also include songs by an artist not specifically listed in the combined preference list, The Who, in this example, provided that the artist falls under a genre included in the combined preference list 420. Artists specifically omitted based on the preferences of at least one individual user list 411, 412, in this example, the Rolling Stones, are preferably omitted from the resulting playlist 450.

The preference lists 411, 412, may be generated by a user 140 (FIG. 1A) of an identification device 145, 245 (FIG. 2B), and stored for use by one or more devices within the system 100 (FIG. 1A), for example, the first rendering device 111, or stored within a device accessible to one or more devices within the system 100 (FIG. 1A), for example a local or remote server 170 (FIG. 3A). The preference lists may include media preferences including preferred genres, artists, songs, styles, time periods (e.g., decade), country or region or origin, moods, themes (such as holiday themes or event themes (e.g., birthday, wedding)). The preference lists may include rendering preferences, as described above. The rendering and/or media preferences may also be location, time of day, and/or device specific. For example, a user may specify a first set of preferences to be implemented by a first rendering device, for example, a bedroom stereo system, and a second set of preferences to be implemented by a second rendering device, for example, a car stereo. The set of preferences may be associated with a type of rendering device, for example, if the rendering device is a car stereo, a personal music system used with headphones, or a household stereo system used with speakers. Similarly, the preferences of a detected user may be learned based on past behaviors associated with the specific detected user.

Figure 6:
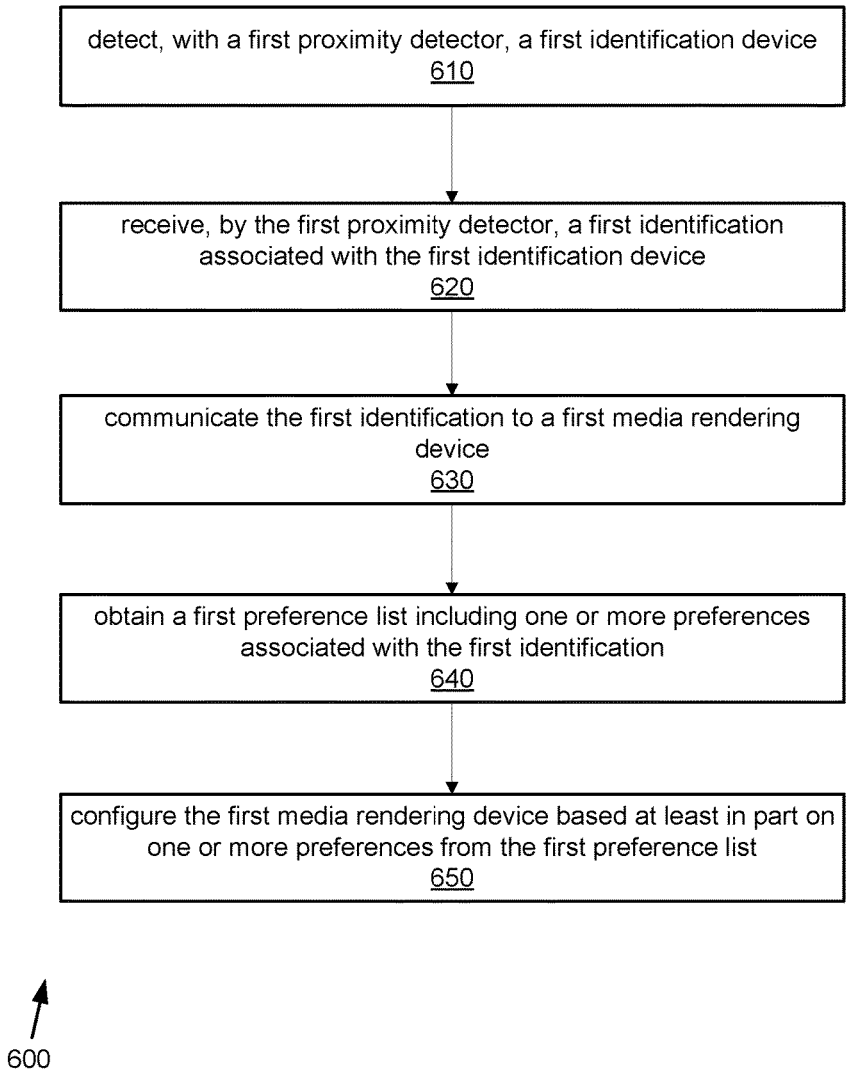
FIG. 6 is a flowchart of an exemplary method for configuring a media rendering system.

FIG. 6 is a flowchart of an exemplary method 600 for configuring a media rendering system. It should be noted that any process descriptions or blocks in flowcharts should be understood as representing modules, segments, portions of code, or steps that include one or more instructions for implementing specific logical functions in the process, and alternative implementations are included within the scope of the present invention in which functions may be executed out of order from that shown or discussed, including substantially concurrently or in reverse order, depending on the functionality involved, as would be understood by those reasonably skilled in the art of the present invention. The method is described with reference to elements shown in FIGS. 1A-1C.

Under the first exemplary method 600, a first identification device 145 is detected with a first proximity detector 121, as shown by block 610. The first proximity detector 121 receives a first identification 146 associated with the first identification device 145, as shown by block 620. For example, the first identification 146 may be a string of characters. The first identification 148 (which may be the same as the second identification 146, as described above) is communicated to a first media rendering device 111, as shown by block 630. A first preference list 411 (FIG. 4A) including one or more preferences associated with the first identification 146 is obtained, as shown by block 640. For example, the first preference list 411 (FIG. 4A) may be recovered from a stored location within the first media rendering device 111, or from a local server 170 (FIG. 3A). The first media rendering device 111 is configured at least in part on based upon one or more preferences from the first preference list 411 (FIG. 4A), as shown by block 650.

Figure 7:
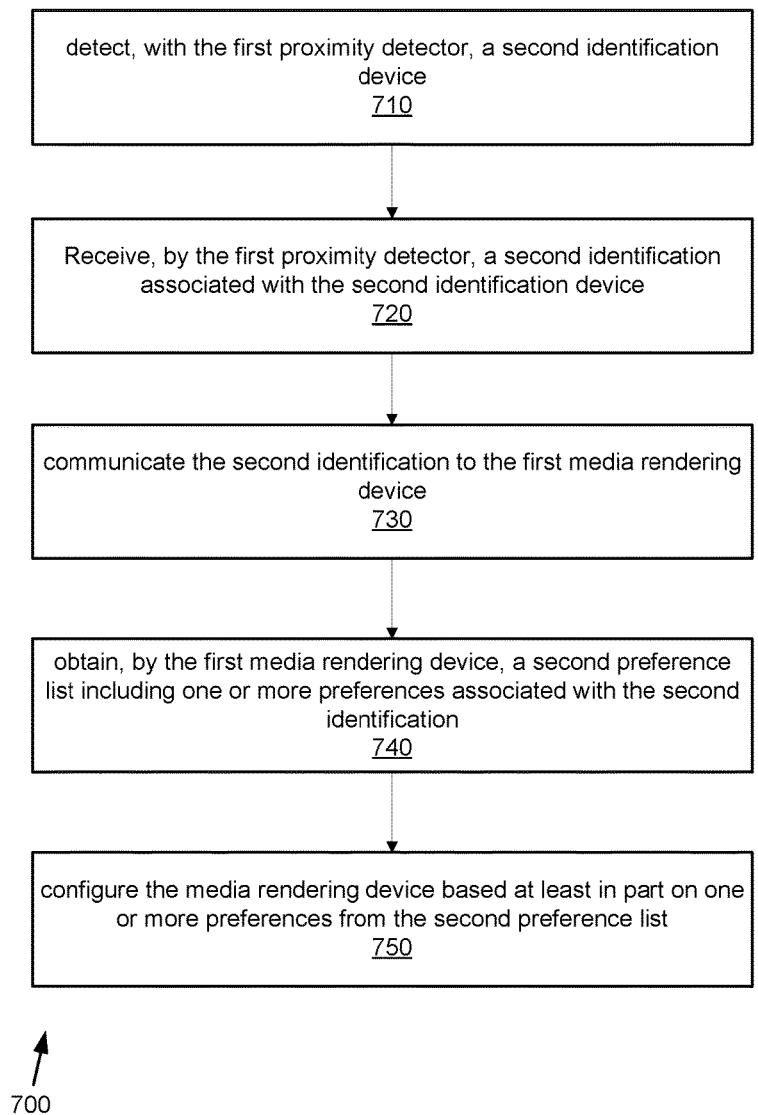
FIG. 7 is a flowchart continuing the exemplary method of FIG. 6.

FIG. 7 is a flowchart of an exemplary method 700 for further configuring a media rendering system. The method is described with reference to elements shown in FIGS. 2A-2B, and may be viewed as a continuation of the method shown in FIG. 6. A second identification device 245 is detected with the first proximity detector 121, as shown by block 710. A second identification 246 associated with the second identification device 245 is received by the first proximity detector 121, as shown by block 720. The second identification 246 (which may be the same as the identification 248) is communicated to the first media rendering device 111, as shown by block 730. The first media rendering device 111 obtains a second preference list 412 (FIG. 4A) including one or more preferences associated with the second identification device 245, as shown by block 740. The first media rendering device 111 is configured based at least in part on one or more preferences from the second preference list 412 (FIG. 4A), as shown by block 750.

As noted above, the identifications 146, 246 communicated from the identification device 145, 245 to the first proximity detector 121 may be the same as, or different from the identifications 148, 248 communicated from the first proximity detector 121 to the first rendering device 111. In a first scenario, the identifications 146, 246 communicated from the identification devices 145, 245 to the first proximity detector 121 may be the same as the identifications 148, 248 communicated from the first proximity detector 121 to the first rendering device 111. Here, the first proximity detector 121 merely relays the identifications 146, 246 to the first rendering device 111, which may use the identifications 146, 246 to fetch user profiles from local or remote storage.

In a second scenario, the identifications 146, 246 communicated from the identification devices 145, 245 to the first proximity detector 121 are different from the identifications 148, 248 communicated from the first proximity detector 121 to the first rendering device 111. Here, the first proximity detector 121 uses the identifications 146, 246 to obtain user profiles, for example, from local or remote storage, which are forwarded to the first rendering device 111 as identifications 148, 248, which may incorporate the identifications 146, 246.

Figure 8:
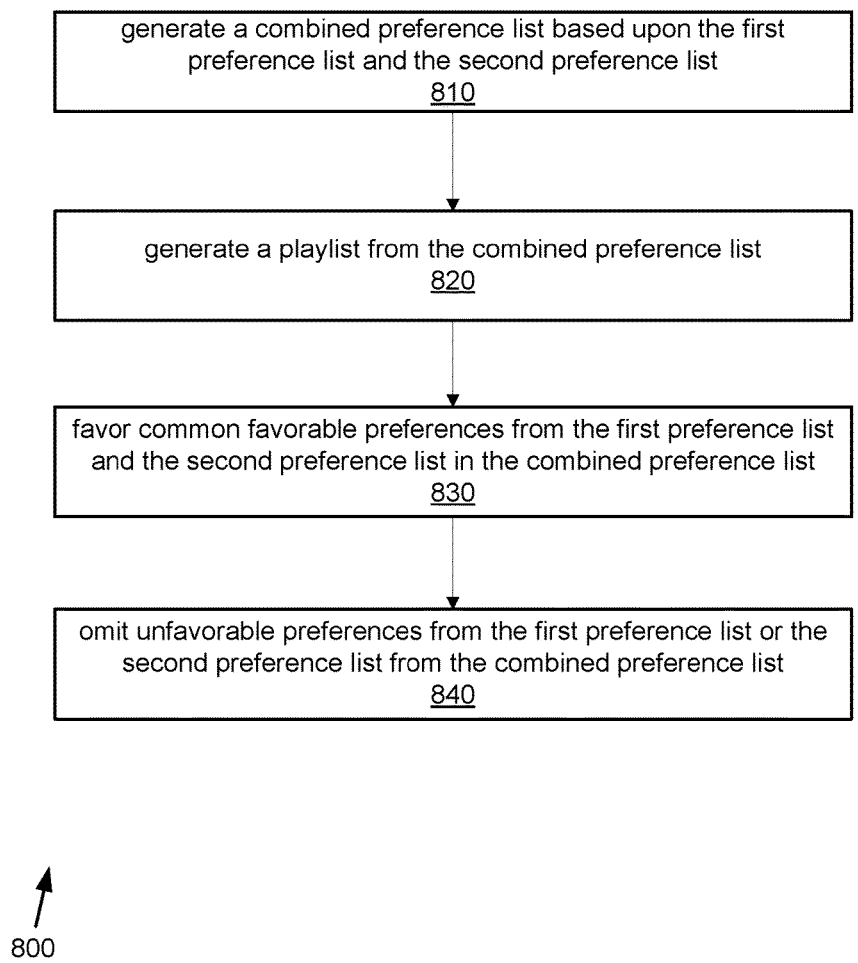
FIG. 8 is a flowchart continuing the exemplary method of FIG. 7 for deriving a combined playlist for a media rendering.

FIG. 8 is an exemplary method described with reference to elements shown in FIGS. 4A-4C, and may be viewed as a continuation of the method shown in FIG. 7. A combined preference list 420 is generated based upon the first preference list 411 and the second preference list 412, as shown by block 810. A playlist 450 is generated from the combined preference list 420, as shown by block 820. Common favorable preferences from the first preference list 411 and the second preference list 412 may be favored in generating the combined preference list 420, as shown by block 430. Unfavorable preferences from the first preference list 411 or the second preference list 412 may be omitted from the combined preference list 420, as shown by block 840.

Figure 9:
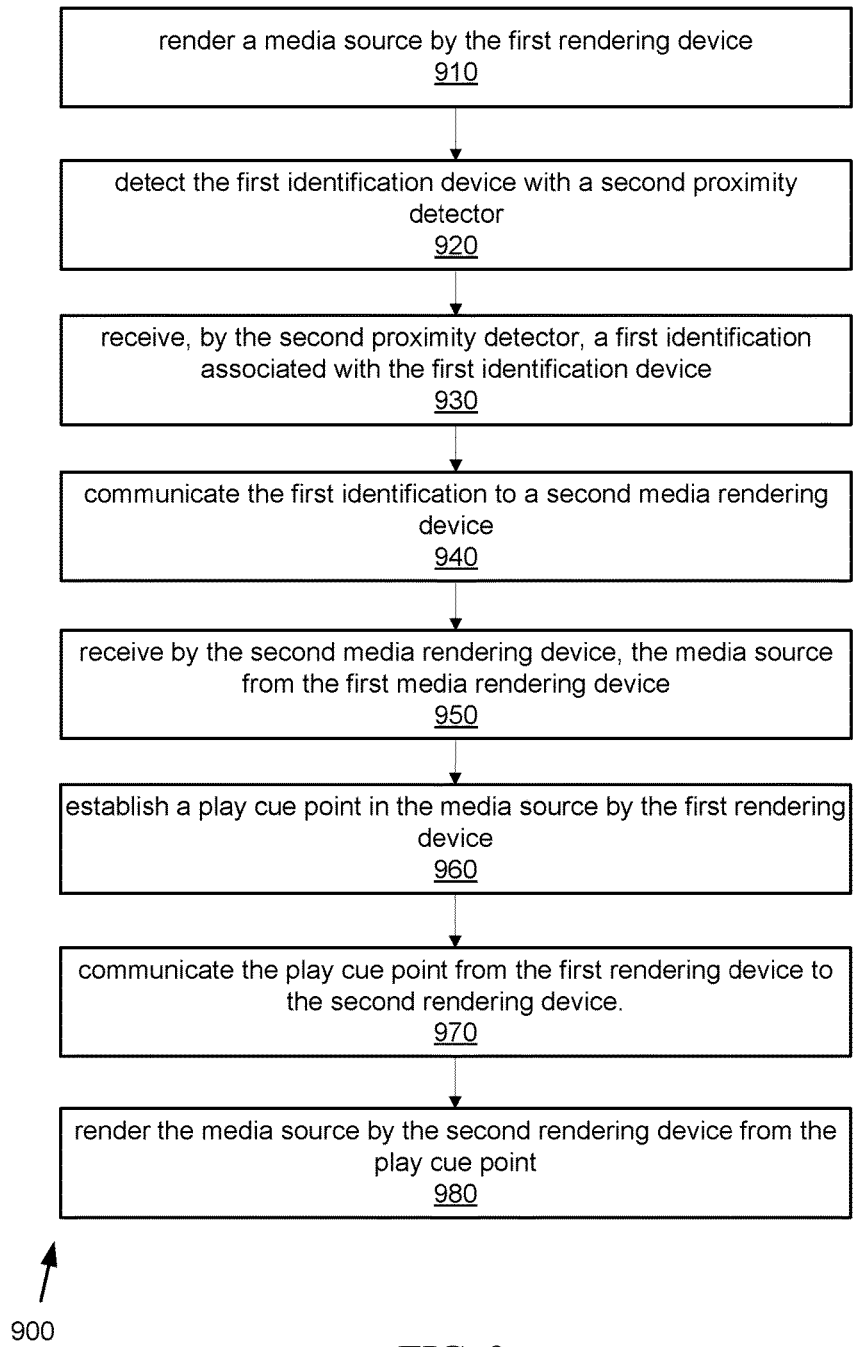
FIG. 9 is a flowchart continuing the exemplary method of FIG. 6 for further configuring a media rendering system containing a second proximity detector and second media rendering device.

FIG. 9 shows a flowchart 900 continuing the exemplary method of FIG. 6 for further configuring a media rendering system 300 containing a second proximity detector 122 and second media rendering device 112. This description makes reference to FIGS. 3A-3B. A media source, for example, media referred to in a playlist or streamed by a media stream, is rendered by the first rendering device 111, as shown by block 910. The first identification device 145 is detected with a second proximity detector 122, as shown by block 920. The second proximity detector 122 may be located in a region 152 different from a region 151 containing the first proximity detector 121. The second proximity detector 122 receives a first identification 146 associated with the first identification device 145, as shown by block 930. The first identification 148 is communicated to a second media rendering device 112, as shown by block 940.

The second media rendering device 112 receives the media source from the first media rendering device 111, as shown by block 950. It should be noted the second media rendering device 112 may receive the actual media source, for example, a media file, or a reference to an external media source that the second media source may access, for example, a network media streaming source. A play cue point in the media source is established by the first rendering device 111, as shown by block 960. The play cue point is communicated from the first rendering device 111 to the second rendering device 112, as shown by block 970. The first rendering device 111 is in communication with the second rendering device 112, for example, via a communication network such as LAN 160 (FIG. 3B). The media source is rendered by the second rendering device 112 from the play cue point, as shown by block 980. As a result, the second rending device 112 begins rendering the same media source from the same cue point as the first rendering device 111 when the first user 140 enters the second room 152.

Figure 5:
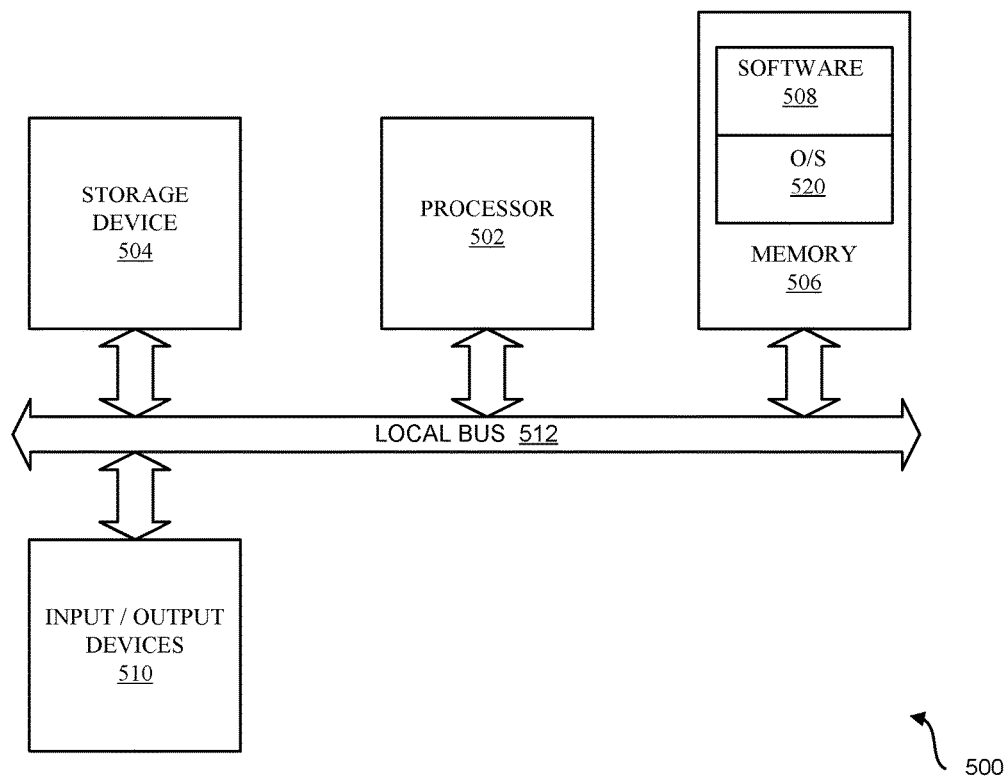
FIG. 5 is a schematic diagram illustrating an example of a system for executing functionality of the present invention.

As previously mentioned, the one or more devices such as the proximity detecting device, the rendering device, and/or the identification device of the present system for executing the functionality described in detail above may be or include a computer, an example of which is shown in the schematic diagram of FIG. 5. The system 500 contains a processor 502, a storage device 504, a memory 506 having software 508 stored therein that defines the abovementioned functionality, input and output (I/O) devices 510 (or peripherals), and a local bus, or local interface 512 allowing for communication within the system 500. The local interface 512 can be, for example but not limited to, one or more buses or other wired or wireless connections, as is known in the art. The local interface 512 may have additional elements, which are omitted for simplicity, such as controllers, buffers (caches), drivers, repeaters, and receivers, to enable communications. Further, the local interface 512 may include address, control, and/or data connections to enable appropriate communications among the aforementioned components.

The processor 502 is a hardware device for executing software, particularly that stored in the memory 506. The processor 502 can be any custom made or commercially available single core or multi-core processor, a central processing unit (CPU), an auxiliary processor among several processors associated with the present system 500, a semiconductor based microprocessor (in the form of a microchip or chip set), a macroprocessor, or generally any device for executing software instructions.

The memory 506 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 506 may incorporate electronic, magnetic, optical, and/or other types of storage media. Note that the memory 506 can have a distributed architecture, where various components are situated remotely from one another, but can be accessed by the processor 502.

The software 508 defines functionality performed by the system 500, in accordance with the present invention. The software 508 in the memory 506 may include one or more separate programs, each of which contains an ordered listing of executable instructions for implementing logical functions of the system 500, as described below. The memory 506 may contain an operating system (O/S) 520. The operating system essentially controls the execution of programs within the system 500 and provides scheduling, input-output control, file and data management, memory management, and communication control and related services.

The I/O devices 510 may include input devices, for example but not limited to, a motion detector, a camera, a radio frequency (RF) detector, a keyboard, mouse, a pattern scanner, touchpad, microphone, etc. Furthermore, the I/O devices 510 may also include output devices, for example but not limited to, a printer, video display, audio transducer, etc. Finally, the I/O devices 510 may further include devices that communicate via both inputs and outputs, for instance but not limited to, a wireless transducer, a modulator/demodulator (modem; for accessing another device, system, or network), a radio frequency (RF) or other transceiver, a telephonic interface, a bridge, a router, or other device.

When the system 500 is in operation, the processor 502 is configured to execute the software 508 stored within the memory 506, to communicate data to and from the memory 506, and to generally control operations of the system 500 pursuant to the software 508, as explained above.

When the functionality of the system 500 is in operation, the processor 502 is configured to execute the software 508 stored within the memory 506, to communicate data to and from the memory 506, and to generally control operations of the system 500 pursuant to the software 508. The operating system 520 is read by the processor 502, perhaps buffered within the processor 502, and then executed.

When the system 500 is implemented in software 508, it should be noted that instructions for implementing the system 500 can be stored on any computer-readable medium for use by or in connection with any computer-related device, system, or method. Such a computer-readable medium may, in some embodiments, correspond to either or both the memory 506 or the storage device 504. In the context of this document, a computer-readable medium is an electronic, magnetic, optical, or other physical device or means that can contain or store a computer program for use by or in connection with a computer-related device, system, or method. Instructions for implementing the system can be embodied in any computer-readable medium for use by or in connection with the processor or other such instruction execution system, apparatus, or device. Although the processor 502 has been mentioned by way of example, such instruction execution system, apparatus, or device may, in some embodiments, be any computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the processor or other such instruction execution system, apparatus, or device.

Such a computer-readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In an alternative embodiment, where the system 500 is implemented in hardware, the system 500 can be implemented with any or a combination of the following technologies, which are each well known in the art: a discreet logic circuit(s) having logic gates for implementing logic functions upon data signals, an application specific integrated circuit (ASIC) having appropriate combinational logic gates, a programmable gate array(s) (PGA), a field programmable gate array (FPGA), etc.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for generating a media playlist by a media rendering device comprising a proximity detector, comprising the steps of:

detecting, with the proximity detector, a first identification device;

receiving by the proximity detector, a first identification associated with the first identification device;

selecting a first preference list associated with the first identification;

detecting, with a proximity detector, a second identification device;

receiving by the proximity detector, a second identification associated with the second identification device;

selecting a second preference list associated with the second identification;

generating a combined preference list based upon the first preference list and the second preference list; and generating a playlist comprising a plurality of songs based on the combined preference list.

2. The method of claim 1, wherein generating the playlist further comprises selecting a first song for the playlist based upon the first preferences list and selecting a second song for the playlist based upon the second preferences list.

3. The method of claim 1, wherein generating the playlist further comprises selecting a song based upon the first preferences list and/or the second preferences list.

4. The method of claim 1, further comprising the steps of omitting from the playlist a song of the plurality of songs based upon an unfavorable preference from the first preference list and/or the second preference list.

5. A media rendering system, comprising:

a first user identification device configured to provide a first user identity identifying the first user identification device;

a second user identification device configured to provide a second user identity identifying the second user identification device;

a proximity detecting device co figured to detect and receive the first user identity from the first user identification device when the first user identification device is located within a proximity detecting region of the proximity detecting device and to detect and receive the second user identity from the second user identification device when the second user identification device is located within a proximity detecting region of the proximity detecting device; and a media rendering device configured to render a media source, wherein the media rendering device is in communication with the proximity detecting device and configured to receive the first user identity and the second user identity from the proximity detecting device and access a first user preference associated with the first user identity and a second user preference associated with the second user identity, and wherein the media rendering device is configured to operate according to a first operating manner derived from the first user preference, the media rendering device is configured to operate according to a second operating manner derived from the second user preference, and the media rendering device is configured to operate according to a third operating manner derived from the first user preference and the second user preference.

6. A media rendering system, comprising:

a proximity detecting device configured to detect and receive a first user identity from a first and a second user identity from a second user; and a media rendering device in communication with the proximity detecting device configured to render a media source, wherein the proximity detecting device is configured to detect the first and second user identity via facial recognition and/or voice-print analysis, and the media rendering device is configured to receive the first user identity and the second user identity from the proximity detecting device and to render media according to an operating manner determined at least in part by the first user identity and/or second user identity, and wherein the media rendering device is configured to access a first user preference associated with the first user identity and a second user preference associated with the second user identity, and wherein the media rendering device is configured to operate according to a first operating manner derived from a first user preference associated with the first user identity, wherein the first media rendering device is configured to operate according to a second operating manner derived from a second user preference associated with the second user identity; and wherein the first media rendering device is configured to operate according to a third operating manner derived from the first user preference and the second user preference.

7. The system of claim 6, wherein the first, second and/or third operating manner consists of one of the group consisting of:

selecting a media file to add to a playlist for rendering by the media rendering device;

selecting a streaming media source for rendering by the media rendering device; and adjusting a rendering parameter, wherein the rendering parameter is selected from a group consisting of an audio volume level, an audio equalization curve, a video brightness setting, a video color ratio, a number of audio channels, an audio speaker configuration, a video resolution, a video aspect ratio, a delay setting, a channel down mix, a channel expansion, a dynamic range ratio, and two or three dimensional video presentation.

8. The system of claim 6, wherein the first, and/or second user preference is specific to one of a group consisting of a location of the media rendering device, a time of day, a type of media rendering device, and a previous behavior associated with the first and/or second user.

9. The system of claim 6, wherein the third operating manner comprises selecting a media source to add to a playlist for rendering by the media rendering device.

10. The system of claim 9, wherein:

the first user preference comprises a first media preference;

the second user preference comprises a second media preference; and selecting the media source further comprises combining the first preference with the second preference.

11. The system of claim 9, wherein the third operating manner consists selecting a media file to omit from the playlist for rendering by the media rendering device.

12. The system of claim 6, wherein the first user identification device and the proximity detecting device are in communication via a communication network.

13. The system of claim 12, wherein at least one of the group consisting of the first user identification device, the proximity detecting device, and the media rendering device is configured to store the one or more user preference.

14. The system of claim 13, wherein the media rendering device is configured to access the one or more user preference via a server in communication with the communication network.

15. The system of claim 12, wherein the media rendering device is in communication with a media source via the communication network.

16. A method for configuring a media rendering system, comprising the steps of:
   detecting, with a proximity detector, a first user identity via facial recognition and/or voice-print analysis;
   receiving by the proximity detector, a first identification associated with the first user identity;
   communicating the first identification to a first media rendering device;
   obtaining, by the first media rendering device, a first preference list comprising one or more preferences associated with the first identification;
   configuring the media rendering device based at least in part on one or more preferences of the first preference list;
   detecting, with the proximity detector, a second user identity via facial recognition and/or voice-print analysis;
   receiving by the proximity detector, a second identification associated with the second user identity;
   communicating the second identification to the first media rendering device;
   obtaining, by the first media rendering device, a second preference list comprising one or more preferences associated with the second identification;
   configuring the first media rendering device based at least in part on one or more preferences of the second preference list.

17. The method of claim 16, wherein configuring the media rendering device further comprises selecting a media source for rendering.

18. The method of claim 17, further comprising a step of rendering the media source by the first rendering device.

19. The method of claim 16, further comprising the steps of:
   generating a combined preference list based upon the first preference list and the second preference list; and
   generating a playlist from the combined preference list.

20. The method of claim 19, further comprising the steps of:
   favoring common favorable preferences from the first preference list and the second preference list in the combined preference list; and
   omitting unfavorable preferences from the first preference list or the second preference list from the combined preference list.

* * * * *